United States Patent [19]

Fuggini et al.

[11] Patent Number: 4,963,432
[45] Date of Patent: Oct. 16, 1990

[54] ONE STEP POLISHING WIPER

[75] Inventors: Cynthia L. Fuggini, Florida, N.Y.; Allan L. Streit, River Vale, N.J.

[73] Assignee: Sterling Drug Inc., Rensselaer, N.Y.

[21] Appl. No.: 335,604

[22] Filed: Apr. 10, 1989

[51] Int. Cl.$^5$ .............................................. B32B 27/00
[52] U.S. Cl. ..................................... 428/290; 428/447; 428/913; 524/267; 524/475; 524/476
[58] Field of Search ....................... 524/267, 475, 476; 428/290, 447, 913

[56] References Cited

U.S. PATENT DOCUMENTS

| | | | |
|---|---|---|---|
| 3,960,575 | 6/1976 | Martin | 106/10 |
| 3,965,518 | 6/1976 | Muoio | 15/104.93 |
| 4,013,475 | 3/1977 | Liebowitz et al. | 106/10 |
| 4,218,250 | 8/1980 | Kasprzak | 106/3 |
| 4,246,029 | 1/1981 | Sanders, Jr. | 106/3 |
| 4,683,001 | 7/1987 | Floyd et al. | 106/3 |
| 4,732,612 | 3/1988 | Steer et al. | 106/10 |

Primary Examiner—James J. Bell
Attorney, Agent, or Firm—John R. Everett

[57] ABSTRACT

A wiper for one step polishing and protecting of a hard surface such as wood and plastic surfaces, e.g. furniture, comprises a nonwoven substrate impregnated with a liquid polish composition comprising by weight of the composition: (a) from about 0.7 to about 7% of an organic polysiloxane having a viscosity of from about 50 to about 100 centistokes at 25° C.; (b) from about 0.1 to about 3.5 of an organic polysiloxane having a viscosity of about 1000 to about 25,000 centistokes at 25° C.; (c) from 0 to about 1.4% of an aminofunctional silicone fluid; (d) from about 0.1 to about 1% of a wax; (e) from about 1 to about 15% of a hydrocarbon solvent having an initial boiling point above about 98° C. and an end boiling point below about 200° C.; (f) from about 0.05 to about 2% of a nonionic emulsifier; and (g) the remainder to 100% water; wherein the ratio of (a) to (b) is from about 2 to 1 to about 5 to 1, the substrate has a basis weight of from about 30 to about 90 g/sq.yd. and a maximum absorbence capacity of about 4 to about 8 times its weight, and the polish composition is loaded onto the substrate at about 25 to about 75% of its maximum absorbence capacity.

18 Claims, No Drawings

ONE STEP POLISHING WIPER

BACKGROUND OF THE INVENTION

1. Field of the Invention

The invention relates to a wiper for one step cleaning and polishing of hard surfaces such as wood and plastic surfaces and more particularly to such a wiper which comprises an absorbent nonwoven substrate wet impregnated with an aqueous cleaning and polishing composition comprising a blend of organic polysiloxanes, a wax, a solvent, an emulsifier and water.

2. Information Disclosure Statement

The cleaning and polishing of wooden surfaces such as furniture, cabinets, woodwork and the like has long been a household chore. Over the years a wide variety of polish compositions have been developed for this purpose resulting in significant improvements not only in the compositions as such but also in the method for their delivery and application to the surface to be polished. For example, the advent of liquid aerosol polish compositions has greatly simplified the polishing of furniture and therefore has enjoyed considerable success.

U.S. Pat. No. 3,965,518 describes as an alternative to an aerosol spray for delivering and applying a furniture polish to household surfaces such as furniture a disposable wiper impregnated with a polish composition. The wiper comprises a cellulosic substrate having a certain specified surface pattern impregnated with an oil-in-water emulsion having an internal phase of mineral oil and silicone fluid in specified amounts and ratios. The oil-in-water emulsion preferably is substantially solvent and wax free although solvent in any amount which would not interfere with film deposition may be used to improve cleaning and waxes up to about 1% may be used.

U.S. Pat. No. 4,683,001 describes a cloth for one step dry-and-shine polishing of wet car surfaces. The cloth is coated or impregnated in a discontinuous manner with a polish composition comprising in specified amounts a silicone oil, a detergent and a soap or wax. The polish composition is applied to the cloth in a carrier such as water and isopropanol in a specified pattern to provide hydrophilic and hydrophobic areas and the carrier then is evaporated at elevated temperatures until the cloth is dry to the touch.

U.S. Pat. No. 3,960,575 describes detergent resistant polish compositions prepared by incorporating in specified amounts an aminofunctional silicon fluid and a hydroxyl-terminated organopolysiloxane and/or a silicone resin into a wax containing polish composition. The compositions may also include an emulsifier and may be formulated as an organic solvent based aqueous emulsion or as a paste.

U.S. Pat. No. 4,013,475 describes wax polishing compositions in the form of a double emulsion which comprises in specified amounts organic solvent, organopolysiloxane, water-in-oil emulsifier, wax particles and water. Blends of organopolysiloxanes of low and high viscosities may be used and additionally amine functional silicones may be included.

U.S. Pat. No. 4,218,250 describes polish formulations containing a wax and/or an abrasive, optionally at least one member selected from solvents, surfactants, thickening agents, detergent resistant additives, colorants and odorants, specified amounts of a cyclodimethylsiloxane fluid and a polydiorganosiloxane-polyoxyalkylene copolymer, and water. The formulations also may contain an organic water-in-oil surfactant having an HLB value of 2 to 10 and/or certain silicone-glycol copolymers.

U.S. Pat. No. 4,246,029 describes a detergent resistant vinyl coating composition containing in specified amounts an aqueous emulsion of a mixture of silicone fluids consisting of an aminofunctional silicone fluid and an organopolysiloxane fluid, a mixture of surface active agents and water.

U.S. Pat. No. 4,732,612 describes furniture polish compositions which are two-phase single emulsions comprising in specified amounts a hydrocarbon solvent of specified boiling range, a certain montan wax ester, an emulsifier of specified HLB the ratio of which to the montan wax ester is greater than 1:1, water and, optionally, a polysiloxane or blend of polysiloxanes having an average viscosity of 20 to 30,000 cs at 25° C.

SUMMARY OF THE INVENTION

A wiper for one step polishing and protecting of a hard surface which comprises a nonwoven substrate impregnated with a liquid polish composition comprising by weight of the composition:

(a) from about 0.7 to about 7% of an organic polysiloxane having a viscosity of from about 50 to about 100 centistokes at 25° C.;

(b) from about 0.1 to about 3.5% of an organic polysiloxane having a viscosity of about 1000 to about 25,000 centistokes at 25° C.;

(c) from 0 to about 1.4% of an aminofunctional silicone fluid;

(d) from about 0.1 to about 1% of a wax;

(e) from about 1 to about 15% of a hydrocarbon solvent having an initial boiling point above about 98° C. and an end boiling point below about 200° C.;

(f) from about 0.05 to about 2% of a nonionic emulsifier; and (g) the remainder to 100% water; wherein the ratio of (a) to (b) is from about 2 to 1 to about 5 to 1, the substrate has a basis weight of from about 30 to about 90 g/sq.-yd. and a maximum absorbence capacity of from about 4 to about 8 times its weight, and the polish composition is loaded onto the substrate at from about 25 to about 75% of its maximum absorbence capacity.

The wiper of the invention provides a convenient one step means of depositing on hard surfaces such as furniture a shiny, protective film of a blend of organic polysiloxanes and a wax without leaving behind any objectionable residue on the treated surface or imparting a greasy feel to the hands and without objectionable build up of the wax component on the surface on repeated treatment of the surface.

DETAILED DESCRIPTION OF THE INVENTION INCLUDING THE PREFERRED EMBODIMENTS

The wipe of the invention comprises a flexible nonwoven substrate impregnated with a polish composition comprising six essential ingredients: a blend of two organic polysiloxanes, one of relatively low viscosity and the other of relatively high viscosity, a wax, a hydrocarbon solvent, a nonionic emulsifier and water. While not essential, the polish composition preferably also includes an aminofunctional silicone fluid.

SUBSTRATE

The substate may be any suitable nonwoven material having good wet strength and fluid absorbency and distribution. Nonwoven fabrics meeting these criteria may be selected from nonwoven fabrics comprising blends of 10 to 70% by weight of polyester fibers with up to 90% by weight of rayon and/or woodpulp fibers. Such fabrics are commercially available or can be prepared by well known processes such as air-laid, wet-laid, spunlaced processes, etc. Depending on the particular process used, some fabrics may include resin binders such as acrylic binders up to 40% by weight to provide adequate wet strength although certain processes such as mechanical bonding processes, e.g., spun-lacing, will provide fabrics which inherently have adequate wet strength. The nonwoven fabric preferably has a basis weight of about 30 to 90 grams per square yard and a maximum absorbence capacity of about 4 to 8 times the fabric weight. Suitable nonwoven fabrics are, for example, a composite of about 50% woodpulp and 50% of a blend of rayon/polyester (70%/30%) having an acrylic binder content of about 20%, a dry thickness of 13 to 15 mils, a basis weight of about 40 g/sq. yd. and a maximum absorbence capacity of 6 to 8 times its weight; a composite of 70% rayon and 30% polyester having an acrylic binder content of about 20%, a dry thickness of about 11 to 13 mils, a basis weight of about 40 g/sq. yd. and a maximum absorbence capacity of 6 to 8 times its weight; and a spunlaced composite of about 59% woodpulp and 41% polyester having no binder content, a basis weight of about 52.5 g/sq. yd. and a maximum absorbence capacity of about 4 times its weight. The latter fabric is available from E.I. Du Pont de Nemours & Company under the tradename SONTARA®8801. Preferably SONTARA®8801 is modified to include about 0.85% of an acrylic binder to reduce linting as described in U.S. Pat. No. 4,666,621, incorporated herein by reference.

The nonwoven substrate should have sufficient flexibility so as to readily conform to the shape of the surface to be polished. Suited for this purpose are nonwoven fabrics in pad or sheet form, the latter being preferred.

Organic Polysiloxane

The polish composition contains both a low viscosity and a high viscosity polysiloxane, the viscosity at 25° C. of the former being 50 to 100 centistokes (cSt) and the latter 1000 to 25,000 centistokes. The ratio by weight of the low to the high viscosity polysiloxane should be in the range of from about 2 to 1 to 5 to 1. The combination of the low and high viscosity polysiloxanes in the above indicated ratios functions to provide ease of application, due primarily to the presence of the low viscosity material, gloss and resistance to streaking and marring.

The organic polysiloxanes may be selected from homopolymers and copolymers of the general formula:

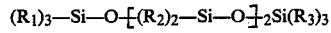

wherein $R_1$, $R_2$ and $R_3$ are hydrocarbon radicals, e.g., alkyl such as methyl and ethyl, and aryl such as phenyl, and n is a integer denoting the degree of polymerization. Typical polysiloxanes of the above general formula which can be used in the polish compositions of the invention are dialkylpolysiloxanes such as dimethyl-, diethyl- and methyl ethyl polysiloxane, diarylpolysiloxanes such as diphenylpolysiloxane, and alkylarylpolysiloxanes such as methyl phenyl polysiloxane. Block polymers of organic polysiloxanes may also be employed. Polysiloxanes of the above general formula where the degree of polymerization is such as to provide polymer viscosities (molecular weights) in the requisite viscosity ranges defined above are commercially available materials. A preferred polysiloxane is dimethylpolysiloxane such as Silicone Emulsion SWS-222 and SWS-225, available from Stauffer-Wacker Silicones Corporation, which are aqueous emulsions of dimethylpolysiloxane having viscosities at 25° C. of about 100 and 10,000 cSt respectively.

The low viscosity polysiloxane is employed at about 0.7 to about 7 percent by weight of the composition, about 1 to about 5 percent being preferred and about 3 to about 5 percent being especially preferred.

The high viscosity polysiloxane is employed at about 0.1 to about 3.5 percent by weight of the composition, about 0.5 to about 1.5 percent being preferred and about 1 to about 1.5 percent being especially preferred.

Aminofunctional Silicone Fluid

Although not essential, the polish composition preferably has incorporated therein an aminofunctional silicone fluid in an amount up to about 1.4 percent by weight, more preferably from about 0.2 to about 0.4 percent. It has been found that the use of an aminofunctional silicone fluid increases the longevity of shine of the dry film deposited from the polish composition. Although aminofunctional fluids rarely are employed in furniture polishes because they tend to build up on a surface after repeated use, it has been found that when incorporated in amounts up to about 1.4 percent by weight, no substantial build up will occur on repeated use. The specific amount which can be used without buildup will depend on the particular aminofunctional silicone fluid employed and can be readily determined by one skilled in the polish art. The aminofunctional silicone fluids contain reactive amine groups on a silicone backbone and are commercially available either as curable or noncurable materials. Aminofunctional silicone fluids which can be employed and their preparation are described in U.S. Pat. Nos. 3,960,575, 4,218,250 and 4,246,029, incorporated herein by reference. A preferred aminofunctional silicone fluid is Silicone Emulsion E-148, available from Stauffer-Wacker Silicones Corporation, which is a 35% aqueous emulsion of a blend of 10% dimethylpolysiloxane and 25% crosslinkable aminofunctional silicone fluid.

Wax

The polish composition contains a wax which is at least partially soluble in the solvent employed in the composition in an amount of about 0.1 to about 1 percent by weight, preferably from about 0.2 to 0.8 percent by weight and more preferably from about 0.2 to about 0.3 percent by weight. The wax contributes to the gloss and depth of gloss of the deposited film and provides a degree of water resistance to the film. The wax may be selected from a wide variety of waxes of animal, vegetable or mineral origin which are well known in the art. For example, suitable waxes are beeswax, carnauba wax, ouricury wax, esparto wax, candelilia wax, microcrystaline wax, paraffin wax, montan wax and derivatives thereof, palm wax and synthetic waxes. Especially preferred waxes are carnauba and montan waxes, the latter being particularly preferred.

Solvent

The solvent employed in the polish composition is a hydrocarbon solvent which, in addition to being a carrier for the film forming ingredients, functions both to remove oil based stains as well as to dissolve wax previously deposited on the surface so as to prevent wax buildup. It is essential that the hydrocarbon solvent have an appropriate evaporation rate, i.e., it should not have too rapid an evaporation rate so as to provide inadequate contact time to dissolve the old wax on the treated surface nor should it have too slow an evaporation rate so as to result in smearing and loss of gloss of the deposited film. Therefore, the hydrocarbon should be selected from amongst those having an initial boiling point above about 98° C. and an end boiling point below about 200° C. Suitable solvents are, for example, kerosene, Stoddard solvent, mineral spirits, paraffinic hydrocarbons, e.g., naptha, and isoparaffinic hydrocarbons such as those available from Exxon Company, U.S.A. under the tradename Isopar, e.g., Isopar E which is a mixture of isoparaffins having a boiling range of from 116° C. to 133° C., and Isopar H which is a mixture of isoparaffins having a boiling range of from 176° C. to 191° C. The isoparaffins are preferred solvents. The amount of solvent employed is from about 1 to about 15 percent by weight, preferably from about 1 to about 9 percent and more preferably from about 1 to about 3 percent.

Emulsifier

The polish composition is formulated as an oil-in-water emulsion. To this end there is included a nonionic emulsifier. The nonionic emulsifier should have an HLB value of from about 2 to 10 and may be selected from a variety of materials such as are conventional in the art. Suitable emulsifiers are, for example, polyoxyethylene sorbitan fatty esters such as the palmitate, stearate and oleate esters each with 20 moles of ethylene oxide (polysorbate 40, 60 and 80 respectively), glycol, glycerol and sorbitol esters such as the laurate, oleate, palmitate and stearate esters and sorbitan sesquioleate and tristearate, the condensation product of one mole of saturated or unsaturated carboxylic acid of 10 to 18 carbon atoms with 5 to 50 moles of ethylene oxide, the condensation product of one mole of saturated or unsaturated alcohols of 10 to 24 carbon atoms with 5 to 50 moles of ethylene oxide, and the condensation product of one mole of alkylphenol, where alkyl has 8 to 18 carbon atoms, with 4 to 50 moles of ethylene oxide.

The emulsifier also provides some degree of cleaning for water based stains.

Sufficient emulsifier is required to provide emulsion stability until the polish composition has been impregnated into the substrate. However, for ease of application to a surface, the emulsion should break readily when applied to the surface and preferably will have broken on the wiper prior to its use. The amount of the emulsifier therefore should be carefully controlled to avoid excessive emulsion stability. The amount of emulsifier which may be employed is from about 0.05 to about 2 percent by weight, preferably from about 0.05 to about 1 percent and most preferably from about 0.05 to about 0.5 percent.

Water

Water functions both as a carrier for the other ingredients of the polish composition as well as to remove water based stains. The amount of water employed will range from about 70 to about 98 percent by weight of the polish composition.

Additional Ingredients

In order to impart aesthetic or other beneficial properties to the polish composition and wiper, additional ingredients as are conventional in polish compositions may be added at concentrations generally known in the art such as UV absorbers, moisturizers, oil phase extenders and fragrances. Preservatives also additionally may be added in effective amounts, i.e., up to about 1 percent by weight, to prevent microbial deterioration of the composition and the substrate such as methyl and ethyl paraben, polyhexamethylene biquanide hydrochloride, hydroxymethoxymethyl 1-aza-3,7-dioxabicyclooctane and chloro methyl isothiazolones.

Substrate Loading

It is preferred that the amount of the polish composition loaded onto the substrate be sufficiently high so as to provide good in use "mileage", i.e., provide coverage of a substantial area of the surface before the composition is exhausted from the substrate, and yet not be so high as to deposit an amount of the composition on the surface which would require a lengthy drying time or leave steaks on the surface. These criteria may be met by loading the substrate to from about 25 to about 75 percent of its maximum absorbence capacity.

The polish composition is applied to the surface to be polished by wiping the surface with the wiper of the invention using about four or five even strokes. Sufficient pressure should be applied during all but the final stroke to insure metering of an adequate amount of the composition onto the surface. Gentle pressure should be used for the final stroke so as to permit reabsorbence by the wiper of any minor excesses of the polish composition on the surface. The composition then is allowed to dry which generally will require two to three minutes. The resulting film will have a shiny, glossy appearance with good depth of gloss and will provide good protection against marring of the treated surface.

The wipers of the invention should be packaged in a manner which will maintain them in a moist condition. A variety of well known packaging methods are available. For example, they may be individually packaged in moisture impervious envelopes or packaged in bulk form in canisters provided with suitable dispensing openings. When packaged in bulk form they may be provided as separate sheets, e.g., in interleaved form, or in the form of interconnected sheets from which individual sheets readily may be separated. In the latter case, reference is made to U.S. Pat. No. 4,017,002.

The oil-in-water polish emulsion is prepared by separately preparing an aqueous phase and an oil phase and then combining these two phases.

The water phase is prepared by adding the water to a mixing vessel and, at ambient temperature and with continual rapid stirring, adding the high and low viscosity polysiloxane emulsions and any aminofunctional silicone fluid emulsion to be included followed by the wax emulsion. Rapid stirring then is continued until the mix is uniform.

The oil phase is prepared by combining in a separate mixing vessel at ambient temperature and with rapid stirring the emulsifier and solvent and any additional oily ingredients such as fragrance, oil phase extender and UV absorber and continuing rapid stirring until the solids are solubilized.

The water phase then is added to the oil phase at ambient temperature and with rapid stirring followed by any preservative to be included and rapid stirring is continued for a time sufficient to complete emulsification, the time required varying with the size of the particular batch.

The polish composition may be loaded onto the substrate by procedures well known in the art such as by spraying or immersion. When packaged in bulk form, as described hereinbefore, a convenient procedure is to place the nonwoven material into the dispensing container, dispensing the polish formula at the desired loading level through a showerhead mounted above the container onto the nonwoven material, capping the container and inverting the container for about 48 hours.

The invention is illustrated by the following examples without, however, being limited thereto.

Oil-in-water emulsion polishes were prepared in accordance with Examples 1 to 6 hereinbelow. The general procedure used for their preparation is as described hereinbefore.

The ingredients employed in preparation of the polish compositions of Examples 1 to 6 are as follows:
(a) Montan wax emulsion—an aqueous emulsion containing Hoechst Wax KSL (American Hoechst Corporation), 14.2% nonoxynol-10 (Triton N-101) (Rohm & Haas Company), 5.2%; 45% potassium hydroxide, 0.4%; ethylene glycol, 0.4%; and water, 79.8%.
(b) Dimethylpolysiloxane, 100 cSt (Silicone Emulsion SWS-222, a 35% aqueous emulsion available from Stauffer-Wacker Silicones Corporation)
(c) Dimethylpolysiloxane, 10,000 cSt (Silicone Emulsion SWS-225, a 35% aqueous emulsion available from Stauffer-Wacker)
(d) Aminofunctional Silicone Fluid (Silicone Emulsion SWS E-148, an aqueous emulsion containing 10% of dimethylpolysiloxane and 25% of crosslinkable aminofunctional silicone fluid, available from Stauffer-Wacker)
(e) Nonoxynol-8 (ethoxylated(8moles) nonylphenol; Igepal CO-610 available from GAF Corporation)
(f) Nonoxynol-4 (ethoxylated(4moles) nonylphenol; Igepal CO-430 available from GAF)
(g) Sorbitan Palmitate (Span 40/ICI Americas, Inc.)
(h) Polyoxyethylene (20 moles) laurate (Alkamuls PSML-20/Alkaril Chemicals, Ltd.)
(i) C8-9 Isoparaffin (Isopar E available from Exxon Company, U.S.A)
(j) C11-12 Isoparaffin (Isopar H available from Exxon)
(k) Preservative: 1,2-dibromo-2,4-dicyanobutane (Tektamer 38, a 25% dispersion in water available from Calgon Corporation) Oil phase extender: petroleum process oil, b.p. 490° F. (Mentor 28 available from Exxon)
(m) Octocrylene (2-ethylhexyl 2-cyano-3,3-diphenylacrylate (Uvinul N-539 available from BASF Wyandotte Corporation)
(n) Moisturizer: almond oil
(o) Fragrance
(p) Water In Examples 1 to 6 below, the letters (a) to (p) in the ingredient column refer to the ingredient list above and the figures in the weight-percent columns denote 100% active ingredients, for example in Example 1, 1.75 weight-percent of (b) denotes 1.75 weight-percent of dimethylpolysiloxane, 100 cSt, thus requiring the use of 5 weight-percent of Silicone Emulsion SWS-22 which is 35% active.

| Ingredient | Weight-Percent Example: | | | | | |
|---|---|---|---|---|---|---|
| | 1 | 2 | 3 | 4 | 5 | 6 |
| a | 0.41 | 0.41 | 0.41 | 0.41 | 0.28 | 0.28 |
| b | 1.75 | 1.75 | 1.75 | 1.75 | 3.50 | 3.50 |
| c | 0.58 | 0.58 | 0.58 | 0.58 | 1.16 | 1.16 |
| d | 0.15 | 0.15 | 0.15 | 0.15 | 0.30 | 0.30 |
| e | 0.50 | 0.50 | 0.50 | — | — | — |
| f | 0.50 | 0.50 | 0.50 | — | — | — |
| g | — | — | — | — | 0.20 | 0.20 |
| h | — | — | — | 0.50 | — | — |
| i | — | — | — | — | — | 1.20 |
| j | 9.00 | 9.00 | 9.00 | 3.00 | 1.20 | — |
| k | — | 0.10 | — | — | — | — |
| l | — | — | 3.30 | — | — | — |
| m | — | — | — | — | 0.40 | 0.40 |
| n | — | — | — | — | 0.80 | 0.80 |
| o | 0.40 | 0.40 | 0.40 | 0.40 | 0.80 | 0.80 |
| p | q.s. to 100% | | | | | |

Wipers in accordance with the invention were prepared as interconnected sheets, each 7.5×10 inches, in perforated roll form using the "showerhead" procedure described above. The nonwoven substrates employed were (A) a composite of 50% woodpulp and 50% of a blend of polyester/rayon (70/30) having an acrylic binder content of about 20%, a dry thickness of 13 to 15 mils, a basis weight of about 40 g./sq.yd. and a maximum absorbence capacity of 6 to 8 times its weight; (B) a composite of 70% rayon and 30% polyester having an acrylic binder content of about 20%, a dry thickness of about 11 to 13 mils, a basis weight of about 40 g/sq.yd. and a maximum absorbence capacity of 6 to 8 times its weight, and (C) Sontara 8801 modified to include 0.85% of acrylic binder having a basis weight of about 52.5 g/sq.yd. and a maximum absorbence capacity of 4 times its weight. Details of the specific wipers prepared are as follows:

| Wiper | Substrate | Polish Composition | Loading (approximate percent of maximum absorbence capacity) |
|---|---|---|---|
| I | A | Example 4 | 31–42% |
| II | A | Example 5 | 28–37% |
| III | A | Example 6 | 28–37% |
| IV | B | Example 2 | 50–67% |
| V | B | Example 3 | 34–45% |
| VI | C | Example 3 | 68% |
| VII | C | Example 1 | 68% |

Each of the wipers described above, when used in accordance with the method described hereinbefore to polish a finished wooden surface gave an acceptable performance in terms of shine, gloss, depth of gloss and lack of wax buildup. Wipers IV, V, VI and VII provided good shine and Wipers II and III performed particularly well in this respect. The film deposited from Wiper I, although providing acceptable shine, was not as shiny as that deposited by the other wipers.

We claim:

1. A wiper for one step polishing and protecting of a hard surface which comprises a nonwoven substrate impregnated with a liquid polish composition comprising by weight of the composition:
   (a) from about 0.7 to about 7% of an organic polysiloxane having a viscosity of from about 50 to about 100 centistokes at 25° C.;
   (b) from about 0.1 to about 3.5% of an organic polysiloxane having a viscosity of about 1000 to about 25,000 centistokes at 25° C.;
   (c) from 0 to about 1.4% of an aminofunctional silicone fluid;
   (d) from about 0.1 to about 1% of a wax;
   (e) from about 1 to about 15% of a hydrocarbon solvent having an initial boiling point above about 98° C. and an end boiling point below about 200° C.;
   (f) from about 0.05 to about 2% of a nonionic emulsifier; and
   (g) the remainder to 100% water; wherein the ratio of (a) to (b) is from about 2 to 1 to about 5 to 1, the substrate has a basis weight of from about 30 to about 90 g/sq.yd. and a maximum absorbence capacity of from about to about 8 times its weight, and the polish composition is loaded onto the substrate at about 25 to about 75% of its maximum absorbence capacity.

2. The wiper of claim 1 wherein the amount of (a) is from about 1 to about 5%; the amount of (b) is from about 0.5 to about 1.5%; the amount of (d) is from about 0.2 to about 0.8%; the amount of (e) is from about 1 to about 9%; and the amount of (f) is from about 0.05 to about 1%.

3. The wiper of claim 2 wherein the amount of (a) is from about 3 to about 5%; the amount of (b) is from about 1 to about 1.5%; the amount of (c) is from about 0.2 to about 0.4%; the amount of (d) is from about 0.2 to about 0.3%; the amount of (e) is from about 1 to about 3%; and the amount of (f) is from about 0.05 to about 0.5%.

4. The wiper of claim 1 wherein the organic polysiloxanes (a) and (b) each is a dimethylpolysiloxane.

5. The wiper of claim 4 wherein (d) is a montan wax; (e) is an isoparaffin; and (f) is selected from the group consisting of the condensation product of one mole of alkylphenol, where alkyl has 8 to 18 carbon atoms, with 4 to 50 moles of ethylene oxide; the condensation product of one mole of a carboxylic acid having 10 to 18 carbon atoms with 5 to 50 moles of ethylene oxide; and a sorbitol ester.

6. The wiper of claim 5 wherein the amount of (a) is from about 1 to about 5%; the amount of (b) is from about 0.5 to about 1.5%; the amount of (d) is from about 0.2 to about 0.8%; the amount of (e) is from about 1 to about 9%; and the amount of (f) is from about 0.05 to about 1%.

7. The wiper of claim 6 wherein the liquid polish composition comprises (a) about 1.75% of dimethylpolysiloxane having a viscosity at 25° C. of 100 centistokes; (b) about 0.58% of dimethylpolsiloxane having a viscosity at 25° C. of 10,000 centistokes; (c) about 0.15% of an aminofunctional silicone fluid; (d) about 0.41% montan wax; (e) about 9% of a $C_{11-12}$ isoparaffin having a boiling range of from 176° C. to 191° C.; (f) about 0.5% of nonoxynol-8 and 0.5% of nonoxynol-4; and (g) the remainder to 100% water.

8. The wiper of claim 7 wherein the substrate is (i) a composite of 70% rayon and 30% polyester; or (ii) a composite of 59% woodpulp and 41% of polyester.

9. The wiper of claim 8 wherein substrate (i) has a basis weight of about 40 g/sq.yd. and a maximum absorbence capacity of about 6 to 8 times its weight; and substrate (ii) has a basis weight of about 52.5 g/sq.yd. and a maximum absorbence capacity of about 4 times its weight.

10. The wiper of claim 9 wherein the loading of the liquid polish composition on substrate (i) is about 34 to about 45% or about 50 to about 67% of its maximum absorbence capacity; and on substrate (ii) is about 68% of its maximum absorbence capacity.

11. The wiper of claim 6 wherein the amount of (a) is from about 3 to about 5%; the amount of (b) is from about 1 to about 1.5%; the amount of (c) is from about 0.2 to about 0.4%; the amount of (d) is from about 0.2 to about 0.3%; the amount of (e) is from about 1 to about 3; and the amount of (f) is from about 0.05 to about 0.5%.

12. The wiper of claim 12 wherein the liquid polish composition comprises (a) about 3.5% of dimethylpolysiloxane having a viscosity at 25° C. of 100 centistokes; (b) about 1.16% of dimethylpolysiloxane having a viscosity at 25° C. of 10,000 centistokes; (c) about 0.30% of an aminofunctional silicone fluid; (d) about 0.28% of montan wax; (e) about 1.2% of a $C_{8-9}$ isoparaffin having a boiling range of 116° C. to 133° C. or a $C_{11-12}$ isoparaffin having a boiling range of 176° C. to 191° C; (f) about 0.2% of sorbitan palmitate; and (g) the remainder to 100% water.

13. The wiper of claim 12 wherein the substrate is a composite of about 50% woodpulp and 50% of a 70%/30% blend of rayon and polyester.

14. The wiper of claim 13 wherein the substrate has a basis weight of about 40 g/sq.yd. and a maximum absorbence capacity of about 6 to 8 times its weight.

15. The wiper of claim 14 wherein the loading of the liquid polish composition onto the substrate is about 28 to about 37% of its maximum absorbence capacity.

16. The wiper of claim 15 packaged in bulk form adapted for the dispensing therefrom of wipers one at a time.

17. The wiper of claim 16 wherein the bulk form comprises a perforated roll of interconnected wipers.

18. The wiper of claim 1 wherein the nonwoven substrate is a blend of from about 10 to about 70% by weight of polyester fibers and up to about 90% by weight of rayon and/or woodpulp fibers.

* * * * *

UNITED STATES PATENT OFFICE
CERTIFICATE OF CORRECTION

PATENT NO. : 4,963,432
DATED : October 16, 1990
INVENTOR(S) : Cynthia L. Fuggini et al It is certified that error appears in the above-identified patent and that said Letters Patent is hereby corrected as shown below:

Col. 9, line 24, the part reading

"from about to about 8"

should read

--from about 4 to about 8--;

Col. 10, line 4, the part reading

" $C_{11-12}$ isoparaffin  "

should read

--$C_{11-12}$ isoparaffin--.

Signed and Sealed this

Tenth Day of March, 1992

*Attest:*

HARRY F. MANBECK, JR.

*Attesting Officer*  *Commissioner of Patents and Trademarks*